United States Patent
Sugimoto

[19]

[11] Patent Number: 6,061,015
[45] Date of Patent: May 9, 2000

[54] VEHICLE OBSTACLE DETECTING SYSTEM

[75] Inventor: Yoichi Sugimoto, Wako, Japan

[73] Assignee: Honda Giken Kogyo Kabushiki Kaisha, Tokyo, Japan

[21] Appl. No.: 09/225,569

[22] Filed: Jan. 5, 1999

[30] Foreign Application Priority Data

Jan. 14, 1998 [JP] Japan .................................. 10-017944

[51] Int. Cl.[7] ............................ G01S 13/60; G01S 13/58
[52] U.S. Cl. ................................ 342/71; 342/27; 342/52; 342/54; 342/61; 342/69; 342/70
[58] Field of Search .................................. 432/21, 27, 28, 432/29, 41, 52–58, 61, 69–72; 342/59

[56] References Cited

U.S. PATENT DOCUMENTS 5,471,214  11/1995  Faibish et al. ............................ 342/70

FOREIGN PATENT DOCUMENTS 4-248489   9/1992  Japan .
7-63842    3/1995  Japan .
8-94749    4/1996  Japan .

*Primary Examiner*—Bernarr E. Gregory
*Attorney, Agent, or Firm*—Arent Fox Kintner Plotkin & Kahn, PPLC

[57] ABSTRACT

A vehicle obstacle detecting system having a combination of different kinds of detectors, such as a laser radar and a millimeter-waver radar, to detect an obstacle present ahead of the course of vehicle travel. The system determines whether the detection output of the laser radar is similar to that of the millimeter-wave radar. When the result is positive, obstacle avoidance control is conducted based on the output of either the laser radar or the millimeter-wave radar. When the result is negative, it is determined that the laser radar (the detector normally of superior performance) is degraded and, based on the output of the millimeter-radar, obstacle avoidance control is conducted. With this, the outputs of the different kinds of detectors are fused and unified optimally, enabling effective obstacle avoidance control.

20 Claims, 9 Drawing Sheets

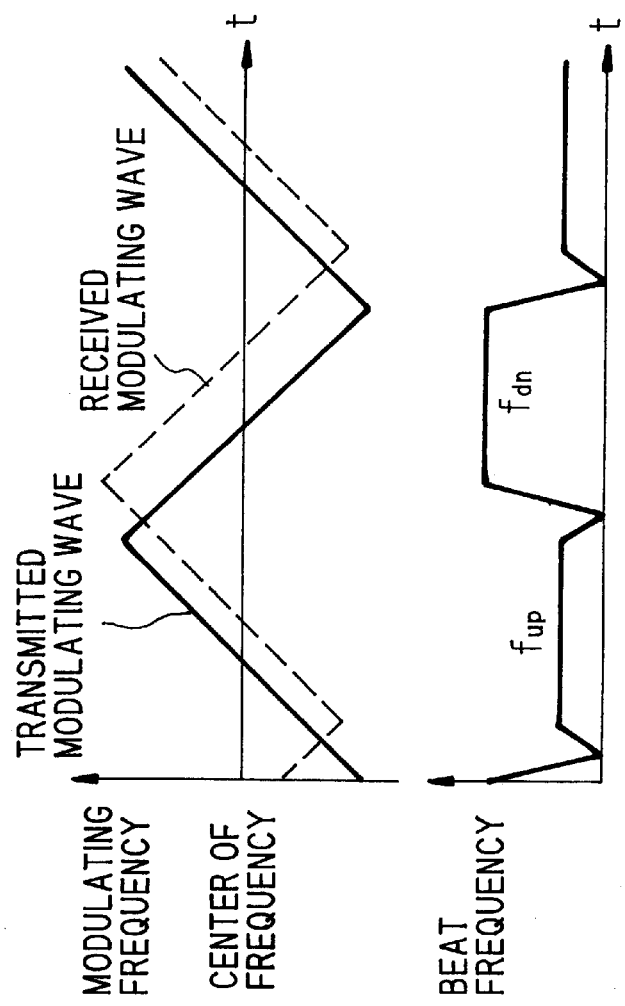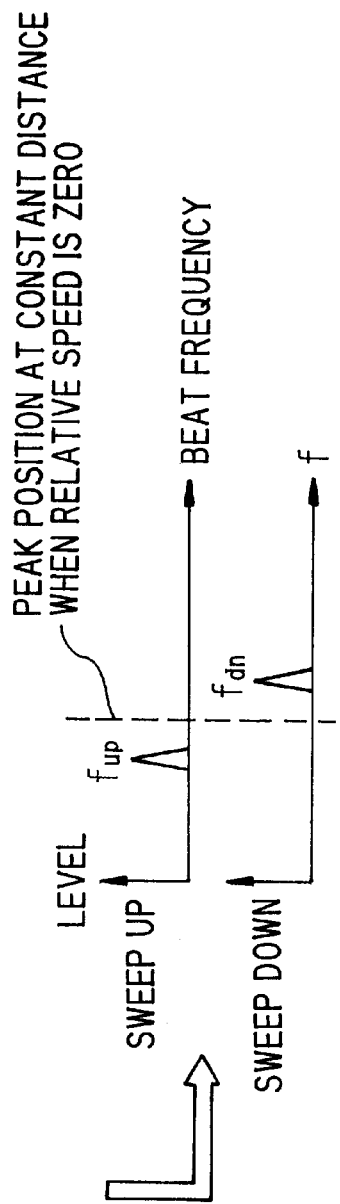
FIG. 3

VEHICLE OBSTACLE DETECTING SYSTEM

BACKGROUND OF THE INVENTION

1. Field of the Invention

This invention relates to a vehicle obstacle detecting system, more particularly to a vehicle obstacle detecting system which has a combination of two kinds of detectors or sensors for detecting an obstacle present ahead on the course of travel of the vehicle.

2. Description of the Related Art

It has hitherto been proposed mounting a laser radar (also known as "lidar"; which emits a laser beam [electromagnetic wave]) or a millimeter-wave radar (which emits a millimeter-wave; an electromagnetic wave of a wavelength different (larger) than the wavelength of the electromagnetic wave emitted by the laser radar) to detect or recognize an obstacle (such as another vehicle present ahead of the vehicle) and based on the result of detection, operating a braking system to decelerate or alerting the vehicle operator. Japanese Laid-open Patent Application Hei 4(1992)-248489 discloses the use of the laser radar. Japanese Laid-open Patent Applications Hei 7(1995)-63842 and Hei 8(1996)-94749 disclose the use of the millimeter-wave radar.

In such a technique, it is necessary to detect or recognize an obstacle present on the course of travel accurately to obtain information such as positional information thereof precisely. However, it is difficult to utilize a detector of a sufficient performance because of, for example, reasons of cost or expense. Conceivably, different kinds of detectors such as the laser radar and the millimeter-wave radar can be used in combination to improve the detection reliability.

When using different kinds of detectors in combination, however, no prior technique has established how to fuse or unify the information obtained from the detectors. In particular, no prior art teaches how to cope with the situation wherein the performance of one of the detectors becomes degraded.

SUMMARY OF THE INVENTION

An object of the invention is therefore to overcome the foregoing problems by providing a vehicle obstacle detecting system which has a combination of different kinds of detectors and which can detect or recognize an obstacle present on the course of vehicle travel accurately, even if the performance of one of the detectors becomes degraded, so as to enable effective avoidance of contact with the obstacle.

To achieve this object, the invention provides an obstacle detecting system for a vehicle, comprising: first obstacle detecting means for emitting an electromagnetic wave towards a course of travel of the vehicle and for receiving an energy reflected from an obstacle present ahead on the course of travel of the vehicle to output a first signal indicative of a first positional relationship of the obstacle and the vehicle; second obstacle detecting means for emitting an electromagnetic wave of a wavelength larger than a wavelength of the electromagnetic wave emitted by the first obstacle detecting means towards the course of travel of the vehicle and for receiving an energy reflected from an obstacle present ahead on the course of travel of the vehicle to output a second signal indicative of a second positional relationship of the obstacle and the vehicle; detection ability degradation determining means for determining degradation of detection ability of the first obstacle detecting means; obstacle recognizing means for recognizing the obstacle with which the vehicle should avoid a contact based on at least one of the first signal and the second signal when the detection ability of the first obstacle detecting means is determined to be not degraded, while recognizing the obstacle based on the second signal when the detection ability of the first obstacle detecting means is determined to be degraded.

BRIEF EXPLANATION OF DRAWINGS

This and other objects and advantages of the invention will be more apparent from the following description and drawings, in which:

FIG. 3 is an explanation view showing the transmitted and received modulating waves of the millimeter-wave radar shown in FIG. 1;

DETAILED DESCRIPTION OF THE PREFERRED EMBODIMENTS

Embodiments of the invention will now be explained with reference to the attached drawings.

Figure 1:
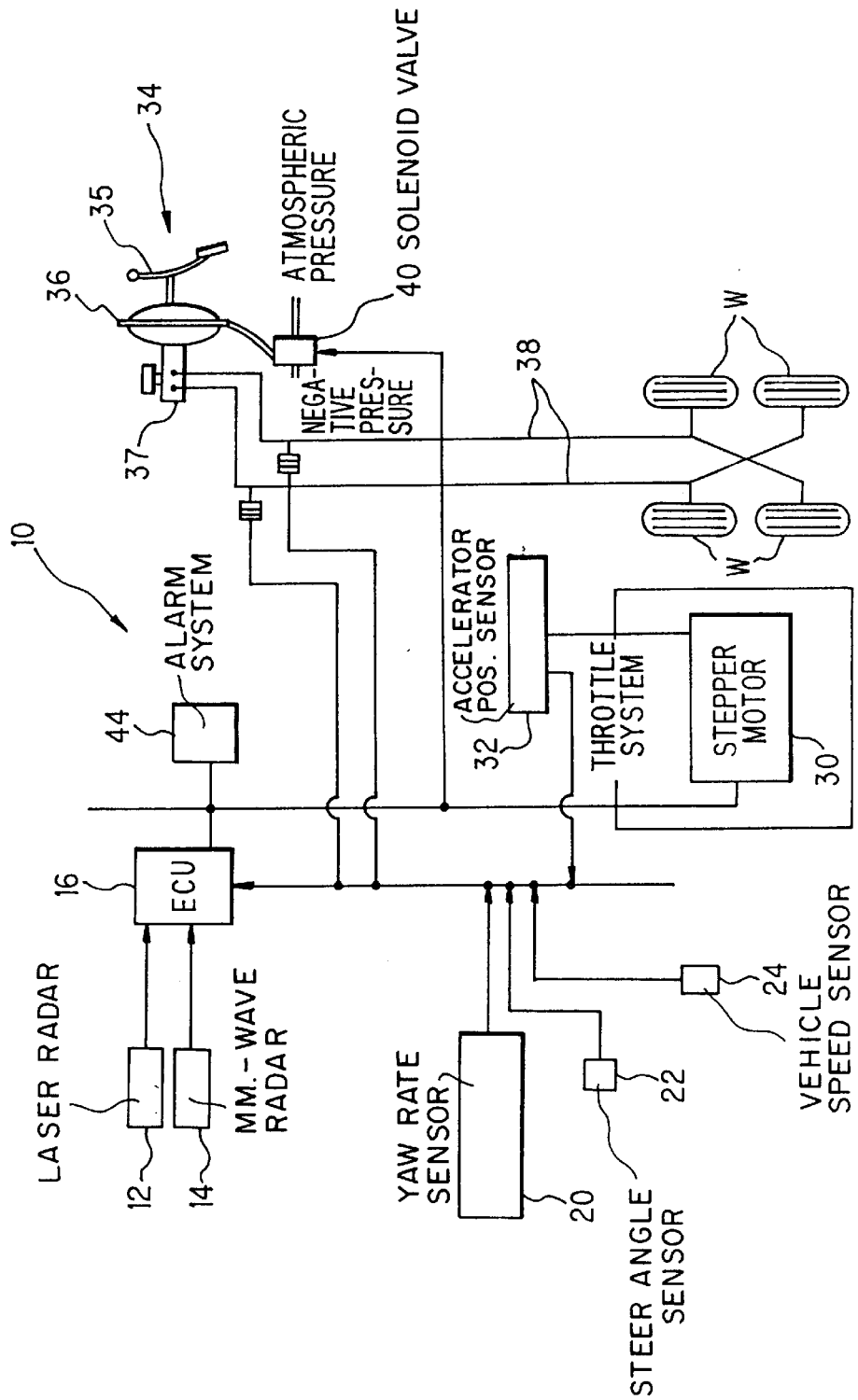
FIG. 1 is an overall schematic view showing the configuration of a vehicle obstacle detecting system according to the invention.
Figure 2:
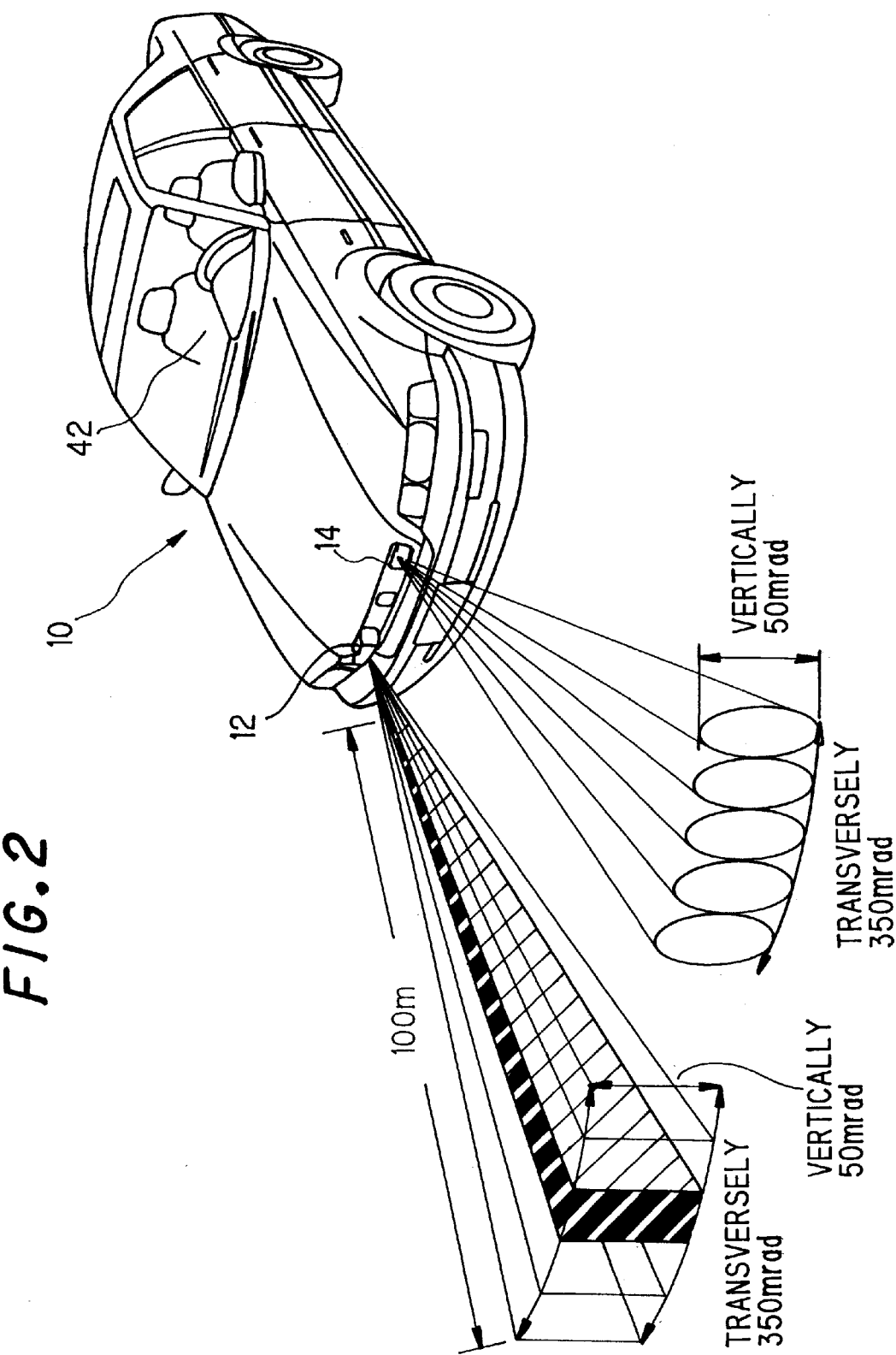
FIG. 2 is a perspective view of the vehicle on which the system is mounted and illustrating beams emitted from a laser radar and a millimeter-wave radar illustrated in FIG. 1.

FIG. 1 is an overall schematic view showing the configuration of a vehicle obstacle detecting system according to the invention, and FIG. 2 is a perspective view of the vehicle on which the system is mounted.

In the figures, reference numeral 10 designates a vehicle. A laser radar (or lidar) 12 is mounted in the proximity of the right headlight (shown in FIG. 2). The laser radar 12 emits a laser beam (which is a narrow beam of coherent, powerful and nearly nonchromatic electromagnetic radiation energy) and receives an energy reflected from an obstacle or object (such as another vehicle present ahead of the subject vehicle 10).

More specifically, the laser radar 12 emits, in pulse, the laser beam (electromagnetic wave) ahead on the course of travel on which the subject vehicle runs. As illustrated in FIG. 2, the laser beam is emitted such that it transversely scans the range of 350 milliradians in the transverse (horizontal) direction and 50 milliradians in the vertical direction.

Similarly, another radar (using a millimeter-wave) 14 is mounted in the proximity of the left headlight, and emits a beam of electromagnetic radiation energy in a millimeter wave (electromagnetic wave of a wavelength larger than the wavelength of the electromagnetic wave emitted by the first radar) and receives an energy reflected from the obstacle or object. The millimeter-wave radar 14 is a frequency modulation type (FM-CW radar) and, as illustrated in FIG. 3, emits FM-CW waves (modulating waves of, e.g., 5 mm in wavelength larger than that of the laser radar 12) and receives similar waves reflected from the obstacle.

The scanning range of the millimeter-wave radar 14 is the same as that of the laser radar 12 as shown in FIG. 2. Although the two beams are illustrated to be separate in FIG. 2 for ease of understanding, actually, the beams are emitted such that their ranges to be scanned overlap with each other.

The laser radar 12 is connected to an electronic control unit (hereinafter referred to as "ECU") 16 comprised of microcomputers. The ECU 16 has a laser radar output processing unit and a millimeter-wave radar output processing unit (neither shown) each comprised of a microcomputer.

The output of the laser radar 12 is forwarded to the ECU 16 and is input to the laser radar output processing unit. The laser radar output processing unit detects the distance (relative distance) to an obstacle or object from the vehicle 10 by measuring the time interval between transmission of the energy and reception of the reflected energy, which establishes the range of the obstacle in the beam's path. Moreover, the laser radar output processing unit detects the (relative) speed of the obstacle by differentiating the measured distance. The laser radar processing unit also detects the direction or orientation of the obstacle from the reflected energy to obtain two-dimensional information describing the obstacle.

The signals transmitted and received by the millimeter-wave radar 14 are similarly forwarded to the ECU 16 and are input to the millimeter-wave radar output processing unit. The millimeter-wave radar output processing unit mixes the received signal with the transmitted signal to generate a beat signal, and detects the relative distance and the relative speed of the obstacle from the frequency in the beat signal (beat frequency). The millimeter-wave radar processing unit also detects the direction or orientation of the obstacle from the reflected energy to obtain similar two-dimensional information describing the obstacle.

Since the laser radar 12 and the millimeter-wave radar 14 used here are those known in the art, no further explanation will be made.

A yaw rate sensor 20 is provided at the center of the vehicle 10 to generate a signal indicative of the yaw rate (yaw angular velocity acting at the center of gravity of the vehicle 10 about the gravitational or vertical direction). The output of the yaw rate sensor 20 is sent to the ECU 16. The ECU 16 detects the yaw angle based on the output of the yaw rate sensor 20.

A steer angle sensor 22 is provided at an appropriate location near the steering mechanism (not shown) of the vehicle 10 to generate a signal indicative of the steer angle θst input through a steering wheel (not shown) by the vehicle operator. A vehicle speed sensor 24 is provided in the proximity of the drive shaft (not shown) to generate a signal indicative of the (traveling) speed of the vehicle 10.

In the vehicle 10, not mechanically linked with the accelerator pedal (not shown) on the floor at the vehicle operator's seat 42, the throttle valve (not shown) installed in the air intake system is connected to a stepper motor 30 and is opened or closed by the motor 30. The accelerator pedal has an accelerator position sensor 32 which generates a signal corresponding to the amount of depression (position) of the accelerator pedal θAP.

The outputs of the sensors are sent to the ECU 16.

The reference numeral 34 indicates a braking system of the vehicle 10. In the braking system 34, a foot brake (brake pedal) 35 is connected, via a negative-pressure booster 36, to a master cylinder 37. The negative-pressure booster 36 has a diaphragm (not shown) which partitions the inside of the booster into two chambers such that the ratio of the negative pressure introduced from the engine intake system (not shown) relative to the atmospheric pressure introduced from outside of the engine is regulated to determine the position of the diaphragm which determines the force to boost the vehicle operator's brake pedal depression.

The master cylinder 37 supplies, via oil paths 38, hydraulic pressure (brake fluid pressure), at a pressure in response to the boosted braking force, to the brake (not shown) provided at the respective wheels W to slow or stop the rotation thereof. An electromagnetic solenoid valve 40 is provided at an appropriate location of the introduction system of the negative pressure and atmospheric pressure (not fully shown). The electromagnetic solenoid valve 40 is connected, via a driver circuit (not shown), to the ECU 16 to receive a command signal (a duty-ratio signal in Pulse Width Modulation) generated by the ECU 16. The electromagnetic solenoid valve 36 opens/closes in response to the command signal to regulate the ratio of the negative pressure relative to the atmospheric pressure and operates the braking system 34 to automatically brake (i.e., to decelerate independently of the vehicle operator's brake pedal depression) the vehicle 10.

Thus, the vehicle is slowed, and possibly stopped, at a rate of deceleration determined by the braking force. The deceleration of the vehicle may also be effected by closing the throttle valve or by discontinuing the supply of fuel to the engine (not shown). The same result may alternatively be obtained through downshifting if the vehicle is equipped with an automatic transmission.

An alarm system (e.g., an audio system or visible indicator) 44 is provided in the proximity of the vehicle operator's seat (shown as 42 in FIG. 2) and is connected to the ECU 16 to receive a command signal, and alerts the vehicle operator in response to the command signal generated by the ECU 16.

As disclosed in FIG. 1, the system is configured to have a combination of the laser radar 12 and the millimeter-wave radar 14 in order that the detection reliability is enhanced.

Although the sensor performance depends on its manufacturing cost, generally speaking, the laser radar 12 is superior to the millimeter-wave radar 14 in position detection accuracy, as mentioned above. In particular, the laser radar 12 has excellent resolving power for detecting direction or orientation. On the other hand, the detection ability of laser radar drops in bad weather conditions. The laser radar 12 is likely to be disturbed due to clutter from rain or fog in bad weather conditions. The detection ability is similarly degraded if a foreign material such as dirt sticks to the laser radar.

This drop of detection ability of the laser radar 12 is greater compared to the millimeter-wave radar 14. In other words, the laser radar 12 is inferior to the millimeter-wave radar in terms of weather- and environment-related limitations. However, although the millimeter-wave radar 14 is superior to the laser radar 12 in weather-proof or environment-proof operation, the millimeter-wave radar 14 is inferior to the laser radar 12 in position detection accuracy, in particular in resolving power in direction or orientation.

Figure 8:
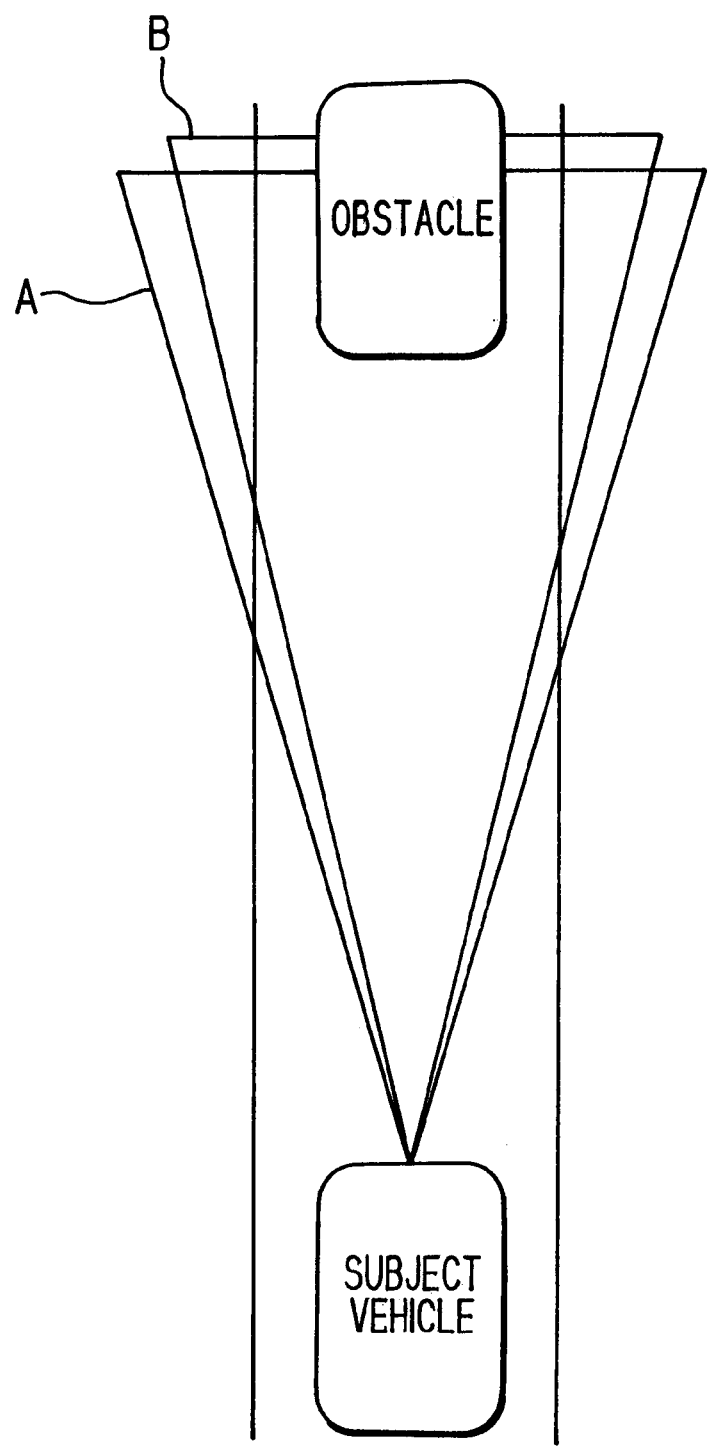
FIG. 8 is an explanatory view showing the detection ranges of the laser radar and millimeter-wave radar in an ordinary situation.
Figure 9:
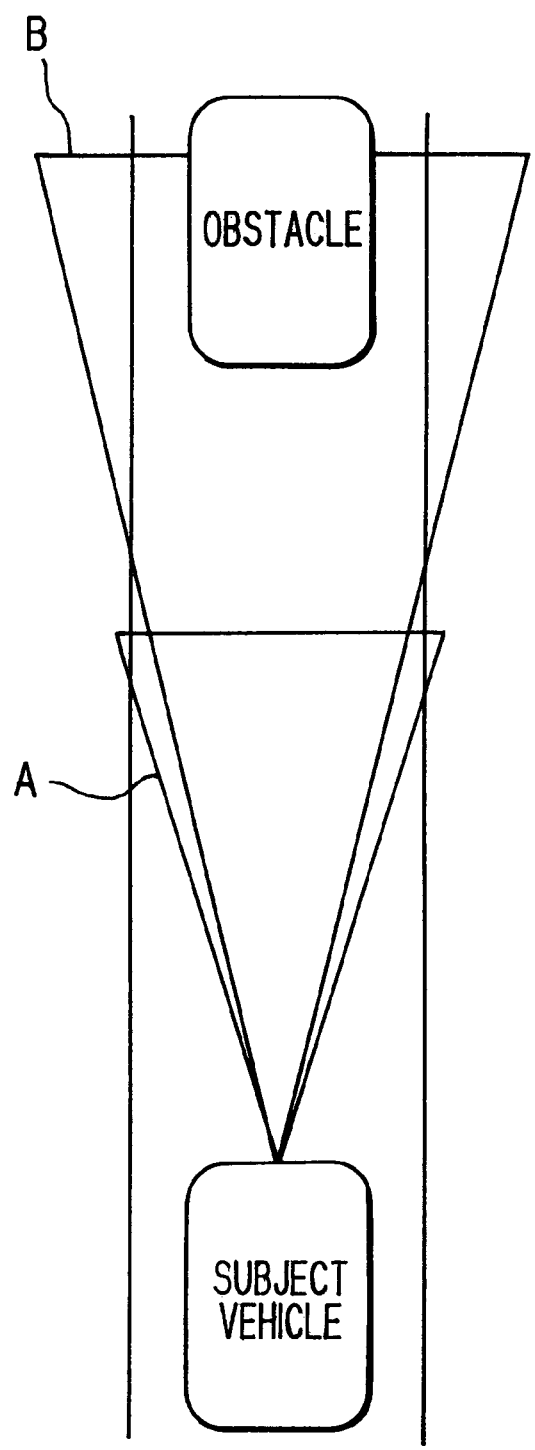
FIG. 9 is a view, similar to FIG. 8, but showing the detection ranges of the radars under bad weather conditions.

To be more specific, the detection range (the area to be scanned;

illustrated by A in FIG. 8) of the laser radar 12 is, if the weather condition is not bad and if a foreign material such as dirt does not stick thereto, approximately 80 meters to 150 meters. The millimeter-wave radar 14 has a similar detection range (illustrated by B in FIG. 8). However, if the weather condition is bad or if a foreign material such as dirt sticks to the laser radar 12, the detection range A of the laser radar 12 drops to approximately 40 meters to 75 meters, as shown in FIG. 9.

In view of the above, the system is configured such that the laser radar 12 is normally used to detect or recognize an obstacle, while it always monitors whether the detection ability of the laser radar becomes degraded, and if it is found that the laser radar detection ability is degraded, the use of the laser radar 12 is switched to the millimeter-wave radar 14 to detect an obstacle from the output of the millimeter-wave radar 14. With the arrangement, the information obtained by the laser radar 12 and the millimeter-wave radar 14 are fused and unified optimally, thereby enhancing the reliability of the system.

Based on the above, the operation of the system will be explained.

Figure 4:
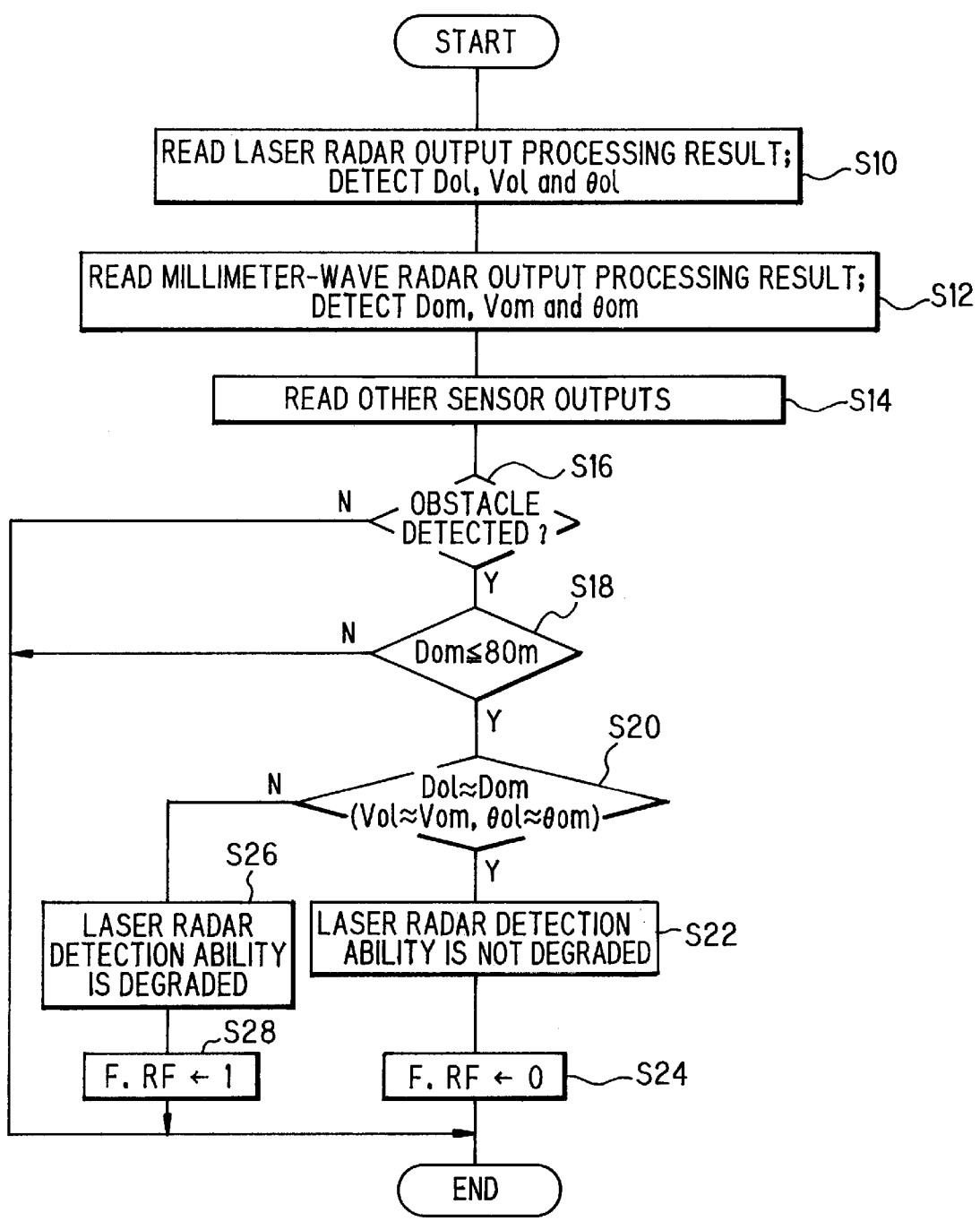
FIG. 4 is a flow chart showing the operation, more particularly, the determination of degradation of detection ability of the laser radar, of the system illustrated in FIG. 1.

FIG. 4 is a flow chart showing the operation of the system. The program shown there is executed, for example, once every 100 milliseconds.

Explaining this, the program begins in S10 in which the laser radar output processing result is read and when any obstacle is detected or recognized, the relative distance Do1 (the distance from the subject vehicle 10 to the obstacle), the moving speed of the obstacle Vo1 and the positional direction of the obstacle $\theta$o1 (viewed from the subject vehicle 10) are detected or determined based on the processing result of the laser radar output.

The obstacle may be a moving object such as another vehicle running ahead on the road in the same course of travel of the subject vehicle 10, or a stationary or fixed object such as a parked vehicle or a guardrail at the side of the road.

The program proceeds to S12 in which the millimeter-wave radar output processing result is read and based thereon, similar parameters are detected or determined.

The parameters detected or determined based on the processing result of the output of the millimeter-wave radar 14 are named with the suffix m such as the relative distance Dom, the obstacle moving speed Vom and the obstacle positional direction $\theta$om. Those obtained from the processing result of the laser radar output are added with the suffix 1 at their end.

The program proceeds to S14 in which the outputs of the other sensors including the vehicle speed sensor 24 are read.

The program next proceeds to S16 in which it is determined whether any obstacle is detected or recognized. This is done by determining whether one from the processing results of the laser radar output and the millimeter-wave radar output includes information for the parameters mentioned above.

When the result in S16 is negative, the program is terminated. When the result is affirmative, on the other hand, the program proceeds to S18 in which the detected relative distance Dom (that obtained from the processing result of the millimeter-wave radar output) is not more than 80 meters.

When the result is negative, the program is terminated. When the result is affirmative, the program proceeds to S20 in which it is determined whether the processing results of the laser radar output and the millimeter radar output are identical (or almost identical) to each other. Specifically, the relative distances Do1 and Dom, the obstacle moving speeds Vo1 and Vom and the obstacle positional directions $\theta$o1 and $\theta$o1 are, respectively, compared with each other and it is determined whether each pair of values is identical (or almost identical).

When the result in S20 is affirmative, the program proceeds to S22 in which it is determined that the detection ability of the laser radar 12 is not degraded and to S24 in which the bit of a flag F.FR is reset to 0. Thus, resetting the flag bit to 0 indicates that the detection ability of the laser radar 12 is determined to be not degraded.

On the other hand, when the result in S20 is negative, the program proceeds to S26 in which it is determined that the detection ability of the laser radar 12 is degraded and to S28 in which the bit of the flag F.FR is set to 1. Thus, setting the flag bit to 1 indicates that the detection ability of the laser radar 12 is determined to be degraded.

Next, the obstacle avoidance control based on the laser radar detection ability determined in the foregoing manner is explained with reference to FIG. 5.

The program begins in S100 in which it is determined whether the flag bit F.FR is set to 1. When the result is affirmative, since this means that the laser radar detection ability is determined to be degraded, the program proceeds to S102 in which the group of parameters obtained from the processing result of the millimeter-wave radar output are selected.

On the other hand, when the result in S100 is negative, since this means that the laser radar detection ability is determined to be not degraded, the program proceeds to S104 in which one group from the laser radar and millimeter-wave radar output processing results is selected; specifically one group of parameters, or more specifically the group of parameters detected from the processing result of the laser radar output, is selected.

The program then proceeds to S106 in which it is determined whether the obstacle moving speed Vo1 (or Vom when the result in S100 is affirmative) is zero or nearly zero, in other words it is determined whether the obstacle is a stationary one such as a vehicle parked at the road side.

When the result is affirmative, the program proceeds to S108 in which a threshold value (distance) for alarming (the value for determining whether alarming to the vehicle operator should be commenced) and another threshold value for deceleration (the value for determining based whether deceleration of the subject vehicle 10 should be commenced), are determined on the assumption that the obstacle is a stationary object. When the result is negative, the program proceeds to S110 in which similar threshold values are determined based on the assumption that the obstacle is a moving object.

Explaining the processing in S108 or S110 more specifically, using the detected vehicle speed V and the obstacle moving speed Vom (or Vo1 if the result in S100 is negative), the relative speed between the subject vehicle 10 and the obstacle is calculated or determined. At the same time, the obstacle deceleration (acceleration) is calculated or determined by obtaining the difference between the current value (that obtained in the current program loop of the flow chart in FIG. 4) and a previous value (that obtained in the previous program of the flow chart).

Based on the calculated values, the distance traveled during the elapsed time during braking of the subject vehicle 10 (obtained through experimentation beforehand), etc., the threshold values for alarming and deceleration are determined.

Figure 6:
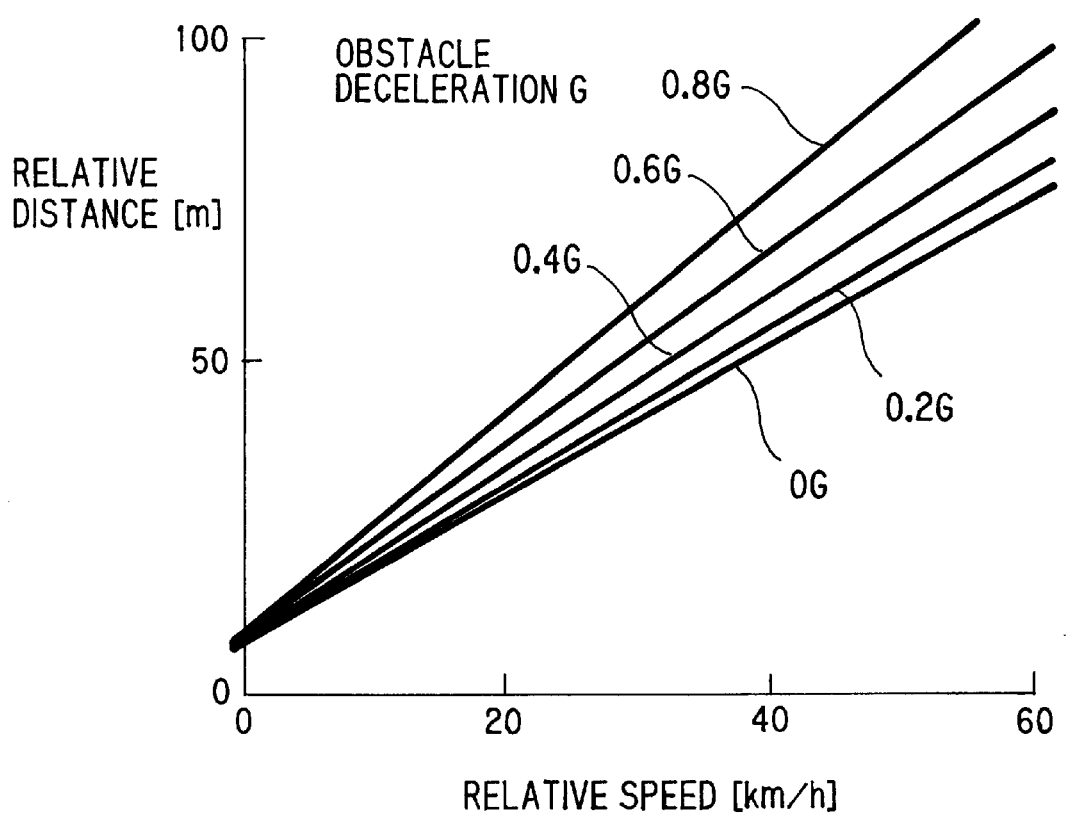
FIG. 6 is a graph illustrating threshold values for alarming referred to in the flow chart of FIG. 5.

The threshold values are determined in accordance with predetermined characteristics and are expressed in terms of the relative distance between the subject vehicle 10 and the obstacle. FIG. 6 illustrates the threshold values for alarming commencement determined separately from the obstacle deceleration. In the figures and specification, G indicates a value corresponding to the acceleration of gravity.

Thus, the threshold values are determined in the steps depending on the results in S100 and S106. Specifically, when it is found in S100 that the flag bit is set to 1, since this means that the obstacle avoidance control is conducted based on the processing result of the millimeter-wave radar 14 which is inferior to the laser radar 12 in position detection accuracy, and when it is found in S106 that the obstacle is a moving object, the threshold values are determined in S110 such that the deceleration should be commenced at a time earlier than that based on the laser radar 12. The deceleration in this case should preferably be not more than a predetermined value (a value corresponding to a gentle deceleration such as 0.2 G, but which may alternatively be a value more or less than 0.2 G).

On the other hand, when it is found in S106 that the obstacle is a stationary object, the threshold values are determined appropriately in S108. In this case, when the result in S100 also indicates that the obstacle avoidance control is conducted based on the processing result of the millimeter-wave radar 14, the threshold values are determined in S108 such that the deceleration should be commenced at a time later than that based on the laser radar 12, thereby preventing an unnecessary deceleration from being commenced. The deceleration in this case should preferably be a value corresponding to a sharp deceleration such as 0.8 G.

In the processing in S108, S110, a third threshold value, for determining whether the deceleration should be changed to a sharp deceleration, is determined. After the subject vehicle 10 has been braked to commence a gentle deceleration (e.g., 0.2 G), the relative distance may sometimes be decreased suddenly due to, for example, a sharp deceleration of the obstacle.

In order to cope with such a situation, the third threshold value is determined in terms of the change of the relative distance (i.e., a value corresponding to the relative speed) for discriminating whether the rate of deceleration should be changed to a sharp deceleration such as 0.8 G. Here, the third threshold value is determined irrespective of whether the laser radar detection ability is degraded or not. However, the third threshold value may be determined differently in response to the laser radar degradation.

In the flow chart, the program then proceeds to S112 in which it is determined whether the detected relative distance is not more than the threshold value for alarming, in other words, it is determined whether the positional relationship between the subject vehicle 10 and the obstacle is at a predetermined first relationship.

When the result in S112 is affirmative, the program proceeds to S114 in which the alarm system 44 is operated to alert the vehicle operator. The vehicle operator will accordingly recognize the possibility of contact with the obstacle and be able to initiate the deceleration which would consequently occur. When the result in S112 is negative, the program is terminated.

The program next proceeds to S116 in which it is determined whether the detected relative distance is not more than the threshold value for deceleration, in other words, it is determined whether positional relationship between the subject vehicle 10 and the obstacle is at a predetermined second relationship.

When the result in S116 is negative, the program proceeds to S118 in which the bit of the flag F.DEC is reset to 0. Resetting the flag bit indicates that the deceleration is not commenced or is discontinued (if already commenced), while setting the bit to 1 indicates the opposite meaning.

When the result in S116 is affirmative, on the other hand, the program proceeds to S120 in which it is determined whether the bit of the flag F.RET is set to 1. When the result is affirmative, the program proceeds to S118 in which the bit of the flag F.DEC is reset to 0, while when the result is negative it proceeds to S122 in which the flag bit F.DEC is set to 1. Here, the fact that the bit of the flag F.RET is set to 1 indicates to release (or discontinue) the deceleration operation (i.e., to release the braking system 34) and the fact that the bit of the flag F.RET is reset to 0 indicates that the deceleration has been terminated.

The program next proceeds to S124 in which the deceleration (braking) operation is commenced so as to effectively avoid the contact with the obstacle.

Figure 5:
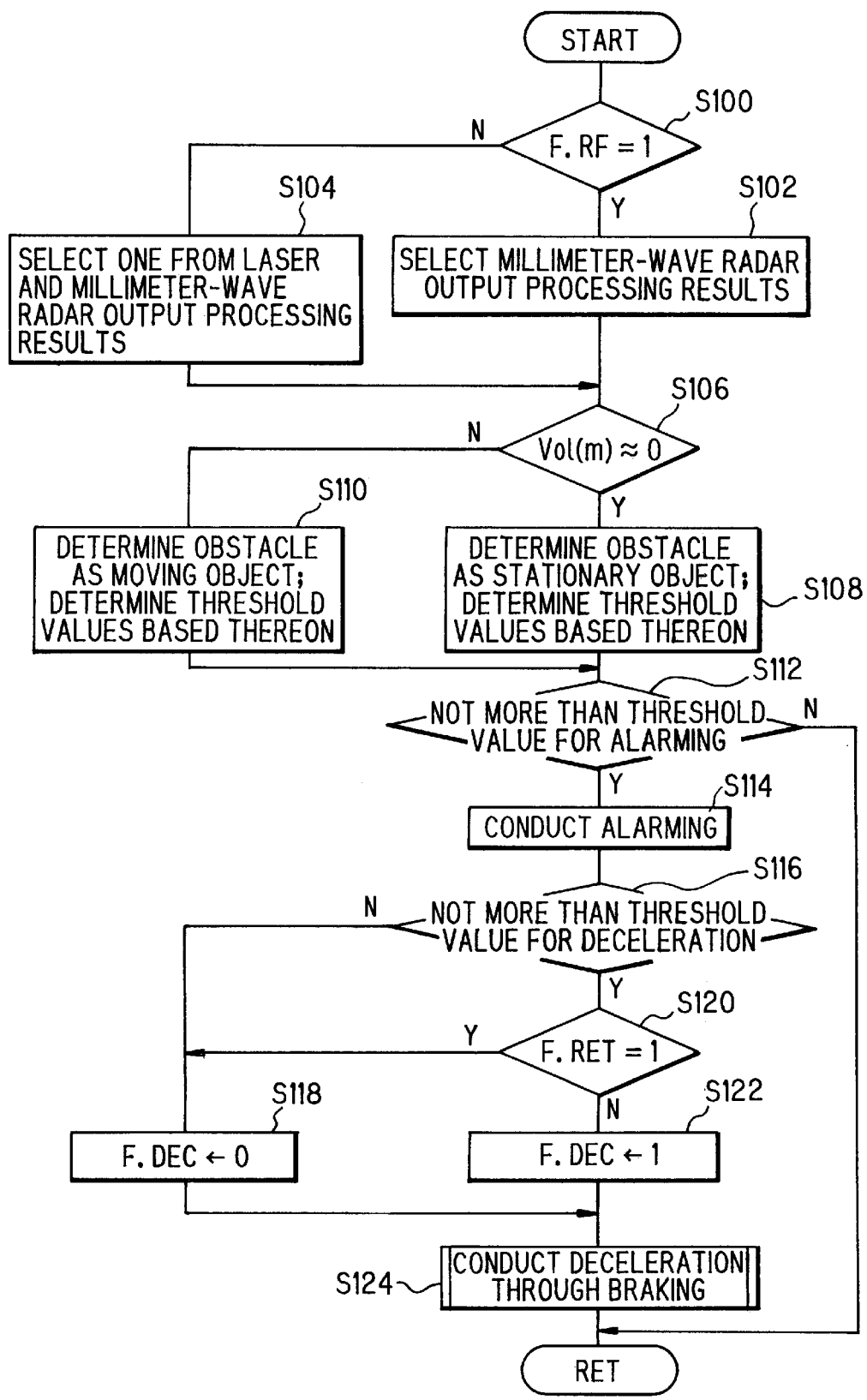
FIG. 5 is a flow chart showing the obstacle avoidance control carried out based on the determination shown in the flow chart illustrated in FIG. 4.
Figure 7:
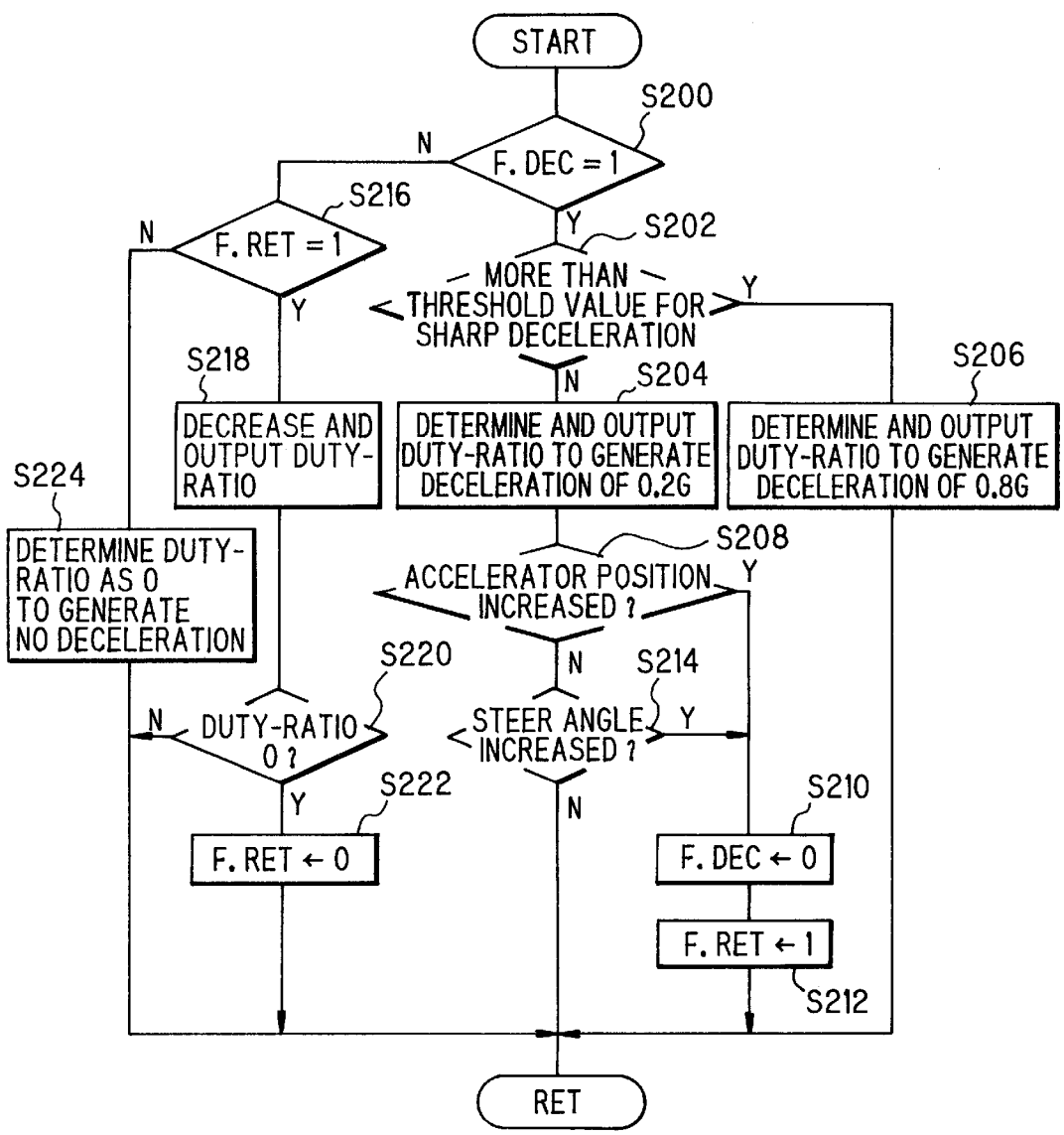
FIG. 7 is a flow chart showing the subroutine of the vehicle deceleration operation referred to in the flow chart of FIG. 5.

FIG. 7 is a flow chart showing the subroutine of the deceleration operation referred to S124 in the flow chart of FIG. 5.

Explaining this, the program begins in S200 in which it is determined whether the bit of the aforesaid flag F.DEC is set to 1 and when the result is affirmative, the program proceeds to S202 in which the change of the relative distance (a value corresponding to the relative speed) is calculated and is compared with the third threshold value to determine whether a sharp deceleration is needed.

When the result is negative, the program proceeds to S204 in which the duty-ratio is determined and is supplied to the electromagnetic solenoid valve 40 through the driver circuit to generate a gentle deceleration of, for example, 0.2 G or thereabout, in other words, to generate a relative small deceleration such as that which a vehicle operator would conduct by manipulating the braking system by himself, so as not to cause the vehicle operator to feel annoyance.

On the other hand, when the result in S202 is affirmative, the program proceeds to S206 in which the duty-ratio is determined and is supplied to the electromagnetic solenoid valve 40 through the driver circuit to generate a sharp deceleration of, for example, 0.8 G. With this, even if the relative distance decreases suddenly due, for example, to a rapid deceleration of the obstacle after the subject vehicle 10 has once been braked at the gentle deceleration such as 0.2 G, contact with the obstacle can reliably be avoided.

Then the program proceeds to S208 in which it is determined whether the accelerator pedal position $\theta AP$ increases, specifically, it is determined whether the amount of depression (position) of the accelerator pedal increases, more specifically it is determined whether the vehicle operator further depresses the accelerator pedal. This is done by calculating the difference between the value detected in the current program loop of the FIG. 5 flow chart and that in the previous program loop and by comparing the difference with a prescribed value.

When the result is affirmative, the program proceeds to S210 in which the bit of the flag F. DEC is reset to 0 and to S212 in which the bit of the flag F.RET is set to 1, whereafter the program is terminated. With this, the deceleration is discontinued in the next program loop.

Explaining this, when it is found that the vehicle operator further depresses the accelerator pedal, it is considered that the vehicle driver has an intention to approach the obstacle upon recognition thereof, more specifically an intention to pass (overtake) the obstacle. Therefore, the deceleration is discontinued to limit the interference with the vehicle operator's driving or steering to a minimum.

When the result in S208 is negative, the program proceeds to S214 in which it is determined whether the steer angle θst detected by the steer angle sensor 22 increases; specifically, it is determined whether the amount of steer increases, more specifically it is determined whether the vehicle operator steers the vehicle positively. This is done by calculating the difference between the value detected in the current program loop of the FIG. 5 flow chart and that in the previous program loop and by comparing the difference with a prescribed value.

When the result is affirmative, the program proceeds to S210 in which the bit of the flag F. DEC is reset to O and to S212 in which the bit of the flag F.RET is set to 1, whereafter the program is terminated. With this, the deceleration is also discontinued in the next program loop.

Explaining this, when it is found that the vehicle operator steers positively, it is considered that the vehicle driver has an intention to pull out the lane of traffic to avoid the obstacle. Therefore, the deceleration is also discontinued to limit the interference with the vehicle operator's driving or steering to a minimum.

On the other hand, when the result in S200 is negative, the program proceeds to S216 in which it is determined whether the bit of the flag F.RET is set to 1 and when the result is affirmative, to S218 in which the duty-ratio to be supplied to the electromagnetic solenoid value 40 is decreased and output to release (decrease) the deceleration. More specifically, the duty ratio is decreased by an amount every time the program is looped in order that the deceleration of, for example, 0.2 G is decreased to 0 G over a period (of 2 sec. or thereabout).

The program then proceeds to S220 in which it is determined whether the duty-ratio has reached to zero, in other words, it is determined whether the braking system 34 has completely been released to the non-braking position. When the result is negative, the program is immediately terminated, while when the result is affirmative, the program proceeds to S222 in which the bit of the flag is reset to 0 and is terminated.

Thus, when returning from the decelerated condition to the non-decelerated condition, since the brake release is not conducted at one time, but is conducted gradually for the period of, for example, 2 sec., a case will not occur wherein the vehicle 10 is accelerated unexpectedly due to the release of the automatic braking, so as to not cause the vehicle operator to feel annoyance.

When the result in S216 is negative, the program proceeds to S224 in which the duty-ratio is determined to be zero, whereafter the program is terminated.

In this embodiment, thus, the system is provided with a combination of different kinds of detectors, i.e., the laser radar 12 and the millimeter-wave radar 14 and when the detection ability of the laser radar 12 is determined to be degraded, the obstacle is detected or recognized based on the processing result of the millimeter-wave radar 14. With this arrangement, even when the laser radar detection capability is found to be degraded, the system initiates alarming or deceleration based on the processing result of the millimeter-wave radar 14, enabling avoidance of contact with the obstacle effectively.

Moreover, the system is configured to prevent an unnecessary deceleration from being generated and if necessary, to generate a deceleration at a timing effective for avoiding the contact. Furthermore, the system can prevent an unnecessary deceleration from being generated if the obstacle is a stationary object such as a vehicle parked at the road side.

Furthermore, since the deceleration is set to a relatively small value that experienced in ordinary vehicle operation, the vehicle operator is not caused to feel annoyance by the deceleration. And, the deceleration is increased, once first decelerated gently, when the possibility of contact rises, thereby surely enabling avoidance of contact with the obstacle.

Thus, the embodiment is configured to have an obstacle detecting system for a vehicle (10), comprising: first obstacle detecting means (laser radar 12, laser radar output processing unit, S10) for emitting a electromagnetic wave towards a course of travel of the vehicle and for receiving an energy reflected from an obstacle present ahead on the course of travel of the vehicle to output a first signal indicative of a first positional relationship (Dol, Vol, θol) of the obstacle and the vehicle; second obstacle detecting means (millimeter-wave radar 14, millimeter-wave radar output processing unit, S12) for emitting an electromagnetic wave of a wavelength larger than a wavelength of the electromagnetic wave emitted by the first obstacle detecting means towards the course of travel of the vehicle and for receiving an energy reflected from an obstacle present ahead on the course of travel of the vehicle to output a second signal indicative of a second positional relationship of the obstacle (Dom, Vom, θom) and the vehicle; detection ability degradation determining means (S18 to S28) for determining degradation of detection ability of the first obstacle detecting means; obstacle recognizing means (S100 to S104) for recognizing the obstacle with which the vehicle should avoid a contact based on at least one of the first signal and the second signal when the detection ability of the first obstacle detecting means is determined to be not degraded, while recognizing the obstacle based on the second signal when the detection ability of the first obstacle detecting means is determined to be degraded.

In the system, the detection ability degrading means determines that the detection ability of the first obstacle detecting means is degraded if the first obstacle detecting means does not detect the obstacle when the second positional relationship is at a predetermined relationship (Dom≦80 meters; S16 to S26).

The system further includes: alarming means (alarm system 44) for alarming when at least one of the first and second positional relationship is at a first predetermined relationship (i.e., the relative distance is not more than a threshold value for alarming; S112, S114).

The system further includes: vehicle decelerating means (braking system 34, S116 to S124, S200 to S224) for decelerating the vehicle when at least one of the first and second positional relationships is at a predetermined second relationship (i.e., the relative distance is not more than a threshold value for deceleration).

In the system, at least one of the first and second positional relationships includes a moving speed (Vol, Vom) of the obstacle; and wherein the system further includes: deceleration delaying means for delaying deceleration by the vehicle decelerating means when the moving speed of the obstacle is not more than a predetermined speed (i.e., the relative distance is not more than a threshold value for deceleration; S106, S108, S116, S124).

In the system, at least one of the first and second positional relationships includes a moving speed (Vol, Vom) of the obstacle; and wherein the system further includes: deceleration delaying means for delaying deceleration by the vehicle decelerating means if the moving speed of the obstacle is not more than a predetermined speed (i.e., zero) when the detection ability of the first obstacle detecting means is determined to be degraded, the deceleration delaying means delaying deceleration by a time which is longer than a time when the detection ability of the first obstacle detecting means is determined to be not degraded (S100, S102, S106, S108, S116, S124).

In the system, the vehicle decelerating means decelerates the vehicle at a value not more than a predetermined value (0.2 G) and to advance a timing to commence deceleration, when the detection ability of the first obstacle detecting means is determined to be degraded (S100, S102, S106, S108, S116, S124).

In the system, the vehicle decelerating means decelerates the vehicle at a value not more than a second predetermined value (0.2 G) and to advance a timing to commence deceleration, if the moving speed of the obstacle is not less than the predetermined speed (i.e., zero), when the detection ability of the first obstacle detecting means is determined to be degraded (S100, S102, S106, S108, S110, S116, S124).

In the system, at least one of the first and second positional relationships includes a relative distance (Dol, Dom) between the vehicle and the obstacle; and wherein the vehicle decelerating means decelerates the vehicle to generate a deceleration which is less than a predetermined value (0.8 G) when the relative distance is not more than a threshold value (S108, S110, S116, S124, S202, S206).

In the system, at least one of the first and second positional relationships includes a relative speed between the vehicle and the obstacle; and wherein the vehicle decelerating means decelerates the vehicle to generate a deceleration which is not less than a predetermined value (0.8 G) when the relative speed (the change of the relative distance) is not less than a threshold value (S108, S110, S116, S124 S202, S206).

The system further includes: accelerator position detecting means (accelerator position sensor 32) for detecting a position of an accelerator pedal (θAP) installed close to a vehicle operator seat in the vehicle; and wherein the vehicle decelerating means discontinues deceleration when the accelerator position is detected to be increased (S116, S124, S208 to S212).

The system further includes: steer angle detecting means (steer angle sensor 22) for detecting a steer angle of the vehicle (θst); and wherein the vehicle decelerating means discontinues deceleration when the steer angle is detected to be increased (S116, S124, S210 to S212).

In the system, the vehicle decelerating means discontinues deceleration gradually for a period (S116, S124, S216 to S224).

In the above, the degradation of detection ability of the laser radar 12 is determined in S20 by determining whether the processing results of the laser radar 12 and the millimeter-wave radar 14 are identical (or almost identical). The degradation may instead by determined by determining whether the strength of reflected energy from the obstacle of the laser radar 12 is significantly lower than that of the millimeter-wave radar 14.

Moreover, it is alteratively possible to configure the system to count the number of times in which the laser radar 12 is determined to be degraded and when the count reaches a prescribed number, to conduct the obstacle detection based on the processing result of the millimeter-wave radar 14. It is further possible to configure the system to alert the vehicle operator to the degradation of the laser radar detection ability through the alarm system 44.

In the above, when it is determined in S208 that the vehicle operator further depresses the accelerator pedal, since the vehicle operator might have depressed accelerator pedal erroneously instead of depressing the brake pedal, the FIG. 7 flow chart may be altered such that the program skips S210, S212 to continue the deceleration operation.

In the above, although the steer angle θst detected by the steer angle sensor 22 is used in S214, it is alternatively possible to use the output of the yaw rate sensor 20 or of an accelerometer which detects the lateral acceleration acting on the vehicle.

In the above, although the pulse-modulation type is used as the radar laser 12 and the FM-CW type is used as the millimeter-wave radar 14, the system is not limited to using them. Other types of radars may alternatively be used.

In the above, although a combination of the laser radar 12 and the millimeter-wave radar 14 is used, this is an example and any other combination may alternatively be possible. For example, a combination of a millimeter-wave radar and another millimeter-wave radar, or a combination of a millimeter-wave radar and a micrometer-wave radar may instead be used. The gist of the invention is to use a combination of sensors which are different from each other in position detection accuracy. The number of radars are not limited to two, and three or more radars may be combined together.

In the above, although the deceleration is conducted through the operation of the braking system 34, the deceleration of the vehicle may be implemented, as mentioned above, by closing the throttle valve or by discontinuing the supply of fuel to the engine (not shown). The same result may alternatively be obtained through downshifting if the vehicle is equipped with an automatic transmission.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. An obstacle detecting system for a vehicle, comprising:

first obstacle detecting means for emitting an electromagnetic wave towards a course of travel of the vehicle and for receiving an energy reflected from an obstacle present ahead on the course of travel of the vehicle to output a first signal indicative of a first positional relationship of the obstacle and the vehicle;

second obstacle detecting means for emitting an electromagnetic wave of a wavelength larger than a wavelength of the electromagnetic wave emitted by the first obstacle detecting means towards the course of travel of the vehicle and for receiving an energy reflected from an obstacle present ahead on the course of travel of the vehicle to output a second signal indicative of a second positional relationship of the obstacle and the vehicle;

determining means for determining a reduction in the detection range of the first obstacle detecting means; and obstacle recognizing means for recognizing the obstacle with which the vehicle should avoid a contact based on at least one of the first signal and the second signal when the reduction in detection range of the first obstacle detecting means is not determined, while recognizing the obstacle based on the second signal when the reduction in detection range of the first obstacle detecting means is determined.

2. A system according to claim 1, wherein the determining means determines the reduction in detection range of the first obstacle detecting means if the first obstacle detecting means does not detect the obstacle when the second positional relationship is at a predetermined relationship.

3. A system according to claim 1, further including:

alarming means for alarming when at least one of the first and second positional relationship is at a first predetermined relationship.

4. A system according to claim 1, further including:

vehicle decelerating means for decelerating the vehicle when at least one of the first and second positional relationships is at a second predetermined relationship.

5. A system according to claim 4, wherein at least one of the first and second positional relationships includes a moving speed of the obstacle; and wherein the system further includes:

deceleration delaying means for delaying deceleration by the vehicle decelerating means when the moving speed of the obstacle is not more than a predetermined speed.

6. A system according to claim 5, wherein the vehicle decelerating means decelerates the vehicle at a value not more than a second predetermined value and to advance a timing to commence deceleration, if the moving speed of the obstacle is not less than the predetermined speed, when the reduction in detection range of the first obstacle detecting means is determined.

7. A system according to claim 6, wherein at least one of the first and second positional relationships includes a relative distance between the vehicle and the obstacle; and wherein the vehicle decelerating means decelerates the vehicle to generate a deceleration which is more than a predetermined value when the relative distance is not more than a threshold value.

8. A system according to claim 6, wherein at least one of the first and second positional relationships includes a relative speed between the vehicle and the obstacle; and wherein the vehicle decelerating means decelerates the vehicle to generate a deceleration which is not less than a predetermined value when the relative speed is not less than a threshold value.

9. A system according to claim 5, further including:

accelerator position detecting means for detecting a position of an accelerator pedal installed close to a vehicle operator seat in the vehicle; and wherein the vehicle decelerating means discontinues deceleration when the accelerator position is detected to be increased.

10. A system according to claim 5, further including:

steer angle detecting means for detecting a steer angle of the vehicle; and wherein the vehicle decelerating means discontinues deceleration when the steer angle is detected to be increased.

11. A system according to claim 4, wherein at least one of the first and second positional relationships includes a moving speed of the obstacle; and wherein the system further includes:

deceleration delaying means for delaying deceleration by the vehicle decelerating means if the moving speed of the obstacle is not more than a predetermined speed when the reduction in detection range of the first obstacle detecting means is determined, the deceleration delaying means delaying deceleration by a time which is longer than a time when the reduction in detection range of the first obstacle detecting means is not determined.

12. A system according to claim 11, further including:

accelerator position detecting means for detecting a position of an accelerator pedal installed close to a vehicle operator seat in the vehicle; and wherein the vehicle decelerating means discontinues deceleration when the accelerator position is detected to be increased.

13. A system according to claim 11, further including:

steer angle detecting means for detecting a steer angle of the vehicle; and wherein the vehicle decelerating means discontinues deceleration when the steer angle is detected to be increased.

14. A system according to claim 4, wherein the vehicle decelerating means decelerates the vehicle at a value not more than a predetermined value and to advance a timing to commence deceleration, when the reduction in detection range of the first obstacle detecting means is determined.

15. A system according to claim 14, wherein at least one of the first and second positional relationships includes a relative distance between the vehicle and the obstacle; and wherein the vehicle decelerating means decelerates the vehicle to generate a deceleration which is more than a predetermined value when the relative distance is not more than a threshold value.

16. A system according to claim 14, wherein at least one of the first and second positional relationships includes a relative speed between the vehicle and the obstacle; and wherein the vehicle decelerating means decelerates the vehicle to generate a deceleration which is not less than a predetermined value when the relative speed is not less than a threshold value.

17. A system according to claim 4, further including:

accelerator position detecting means for detecting a position of an accelerator pedal installed close to a vehicle operator seat in the vehicle; and wherein the vehicle decelerating means discontinues deceleration when the accelerator position is detected to be increased.

18. A system according to claim 17, wherein the vehicle decelerating means discontinues deceleration gradually for a period.

19. A system according to claim 4, further including:

steer angle detecting means for detecting a steer angle of the vehicle; and wherein the vehicle decelerating means discontinues deceleration when the steer angle is detected to be increased.

20. A system according to claim 19, wherein the vehicle decelerating means discontinues deceleration gradually for a period.

* * * * *